United States Patent
Zhang et al.

(10) Patent No.: US 10,798,964 B2
(45) Date of Patent: Oct. 13, 2020

(54) METHOD FOR IMPROVING MOLDABILITY AND 3D PRECISION PRINTING PERFORMANCE OF HIGH-FIBER DOUGH SYSTEM BY ADDING FUNCTIONAL CARBOHYDRATE

(71) Applicants: Jiangnan University, Wuxi (CN); Nanjing Jianggao Drying Equipment Company Ltd., Nanjing (CN)

(72) Inventors: Min Zhang, Wuxi (CN); Zhenbin Liu, Wuxi (CN); Chaohui Yang, Nanjing (CN)

(73) Assignees: Jiangnan University, Wuxi (CN); Nanjing Jianggao Drying Equipment Company Ltd., Nanjing (CN)

( * ) Notice: Subject to any disclaimer, the term of this patent is extended or adjusted under 35 U.S.C. 154(b) by 538 days.

(21) Appl. No.: 15/673,897

(22) Filed: Aug. 10, 2017

(65) Prior Publication Data

US 2018/0049464 A1    Feb. 22, 2018

(30) Foreign Application Priority Data

Aug. 16, 2016    (CN) .......................... 2016 1 0672261

(51) Int. Cl.
| | | |
|---|---|---|
| *A23P 20/20* | (2016.01) | |
| *B33Y 70/00* | (2020.01) | |
| *B33Y 10/00* | (2015.01) | |
| *B33Y 40/00* | (2020.01) | |
| *B33Y 80/00* | (2015.01) | |
| *A23L 5/10* | (2016.01) | |
| *A23P 20/25* | (2016.01) | |

(52) U.S. Cl.
CPC ................. *A23P 20/20* (2016.08); *A23L 5/15* (2016.08); *B33Y 10/00* (2014.12); *B33Y 40/00* (2014.12); *B33Y 70/00* (2014.12); *B33Y 80/00* (2014.12); *A23P 2020/253* (2016.08); *A23V 2002/00* (2013.01)

(58) Field of Classification Search
CPC ...................................................... B33Y 10/00
See application file for complete search history.

(56) References Cited

U.S. PATENT DOCUMENTS

| | | | | |
|---|---|---|---|---|
| 2010/0015295 A1* | 1/2010 | Haas | ...................... | A21D 15/08 426/94 |
| 2011/0014321 A1* | 1/2011 | Hellaby | ................. | A21D 15/06 426/25 |
| 2017/0223993 A1* | 8/2017 | Plummer | ................ | A23L 19/09 |

FOREIGN PATENT DOCUMENTS

| | | | |
|---|---|---|---|
| CN | 103734216 A | | 4/2014 |
| CN | 104365954 A | | 2/2015 |
| CN | 104687222 A | | 6/2015 |
| CN | 104920755 A | | 9/2015 |
| CN | 104938562 A | | 9/2015 |
| CN | 104938739 A | | 9/2015 |
| CN | 104996691 A | | 10/2015 |
| CN | 105831198 A | * | 8/2016 |

OTHER PUBLICATIONS

English abstract CN104522551 A (Year: 2015).*

* cited by examiner

*Primary Examiner* — Katherine D LeBlanc
(74) *Attorney, Agent, or Firm* — The Webb Law Firm

(57) ABSTRACT

A method for improving the moldability and 3D precision printing performance of a high-fiber dough system by adding functional carbohydrate, and belongs to the technical field of fruit-vegetable food processing. The method includes preparation of aged flour, beating and concentrating of old stalks of asparagus, beating of butter, adding functional carbohydrate to mix materials, 3D printing and the like. Baked aged flour, concentrated asparagus pulp made from the old stalks of asparagus, the butter and the functional carbohydrate are uniformly mixed, and then printed by means of a 3D printer. With carbohydrate being a major ingredient, the 3D printing materials provided contain rich dietary fibers, and can serve as basic food to provide energy for people. The precision of a printed object can be greatly improved by adjusting different printing parameters such as a nozzle diameter, a printing distance and a printing temperature.

1 Claim, No Drawings

METHOD FOR IMPROVING MOLDABILITY AND 3D PRECISION PRINTING PERFORMANCE OF HIGH-FIBER DOUGH SYSTEM BY ADDING FUNCTIONAL CARBOHYDRATE

CROSS-REFERENCE TO RELATED APPLICATION

This application claims priority to Chinese Patent Application No. 201610672261.7 filed Aug. 16, 2016, the disclosure of which is hereby incorporated in its entirety by reference.

TECHNICAL FIELD

The present invention relates to a method for improving the moldability and 3D precision printing performance of a high-fiber dough system by adding functional carbohydrate, and belongs to the technical field of fruit-vegetable food processing.

BACKGROUND ART

The 3D printing technology is also known as an additive manufacturing technology or a rapid proto-typing technology, through which objects of three-dimensional structures are produced through computer modeling in a continuous physical layer stacking mode. The working principle of 3D printing is similar to that of an ordinary printer, but 3D printing can adapt to different printing materials such as metal, ceramic, plastic and sand. A computer slicing program written in advance controls a printer to print various three-dimensional objects. The 3D printing technology belongs to a full-automatic intelligent technology and can meet human individualized demands and save time and labor cost.

However, research on 3D printing applied to the field of food is not abundant yet. The demand for individualized food of people can be better met by applying 3D printing to the field of food, food containing different nutritional ingredients can be produced according to target population, and the range of food materials can be expanded to facilitate development of the food industry.

Prepared and restructured food is packaged food which is prepared in the mode that different types of food materials are mixed uniformly according to a specific formula and subjected to certain steps of pretreatment and processing. Then the food is stored, transported and sold. Individualized and entertainment-oriented dietary demands of people can be better met by applying the 3D printing technology to the aspect of individualized customization production of the restructured food, and the dietary quality of people is improved.

Wei Honghui et al. (2015) invented "Edible 3D printing material and preparation method thereof" (publication number: CN 104938562 A). Raw materials include main materials and auxiliary materials. The main materials include 40% to 60% of starch, 12.5% to 13.5% of water, 4% to 6% of free sugar and the like while the auxiliary materials include methyl cellulose enzyme, mineral substances, cyclic oligosaccharide and the like. With the main ingredient being carbohydrate, the 3D printing material is edible and is basic food for energy supplementation of people. However, the invention only relates to preparation of the 3D printing material while influences of printing parameters on printing performance and printing precision are not specifically presented. However, in the present invention, after the optimal printing materials are determined, optimal printing parameters are also specifically determined, and the printing precision is improved.

Wei Honghui et al. (2015) invented "Easily stored 3D printed candy raw material and manufacturing method thereof" (publication number: CN 104920755 A). The raw material comprises the following components in percentage by weight: 20% to 85% of glucose, 0.5% to 5% of cellulose, 6% to 10% of xylitol, 3% to 15% of maltodextrin and various other auxiliary materials. Candies can be produced in a 3D printing mode through the formula, creative production of the candies is achieved, and individualized customization demands of people are met. In the invention, what are printed are mainly the candies. However, in the present invention, research on the printing performance of the high-fiber dough system with the functional carbohydrate added is made.

Xuan Xinlong et al. (2015) invented "Method of pure cocoa butter type chocolate for 3D printing (publication number: CN 104996691 A). The inventors perform pretreatment, refining, filling and temperature regulation on raw materials including cocoa butter liquid blocks, white granulated sugar, cocoa butter, dried skim milk powder, an emulsifier and the like, and prepared slurry is printing formed by means of a 3D printer. The chocolate disclosed by the invention is hard to grow dim or become white. Meanwhile, unnecessary waste can be reduced, and cost is saved. In the invention, research is made mainly on chocolate printing and is obviously different from research made mainly on the printing materials with the carbohydrate serving as a basic material in the present invention.

Li Heng et al. (2014) invented "3D dessert printing processing device and corresponding processing method" (publication number: CN 103734216 A). Firstly, a target image of a dessert is converted into a data file through modeling; then, after slicing by adoption of slicing software, raw materials are printing-formed by means of a printer; and baking is performed to obtain a finished product. The invention skillfully integrates the 3D printing technology and individualized food producing, desserts which are exquisite in structure, attractive in appearance and high in precision can be produced, and demands of specific population and places can be met; and the processing method is simple to operate, cream can be continuously pasted in three-dimensional directions, and the practicability is high. The printing device and the processing method are mainly provided by the invention while research on influences of formulas of different materials and the printing parameters on printing precision is simultaneously made in the present invention. Obvious differences exist therebetween.

Huang Haihu et al. (2015) invented "Non-dairy cream 3D printing method" (publication number: CN 104687222 A). To better fix and shape non-dairy cream, a cooling system is mounted on a traditional printer. Meanwhile, non-dairy cream molecules can be smashed and refined by adoption of ultrasonication, blockage, caused by uneven mixing of the non-dairy cream, of a spray barrel is prevented, and accordingly the printing effect of a 3D printing system is improved. A research system of the invention is the non-dairy cream, and a printing object of the present invention is high-fiber dough.

Wei Honghui et al. (2015) invented "Candy pulp capable of being used for 3D printing and preparation method of candy pulp" (publication number: CN 104938739 A). The candy pulp comprises the following components in percentage by weight: 50% to 85% of glucose, 0.5% to 5% of cellulose, 6% to 10% of xylitol, 3% to 15% of maltodextrin and various other auxiliary materials. The cellulose is contained in the pulp, heat resisting stability of candies in storage can be improved, and also viscosity of the candy pulp can be stabilized. A small amount of xylitol can improve the fluidity of the candy pulp, and smooth discharging can be achieved during printing. The invention only relates to a printing material while influences of the printing parameters on printing performance and the printing precision are not specifically presented. However, in the present invention, after the optimal printing materials are determined, the optimal printing parameters are also specifically determined, and the printing precision is improved.

Zhao Wanyi et al. (2014) invented "3D printing production method of multi-flavor sandwich food" (publication number: CN 104365954 A). According to the invention, food with a multi-flavor spatial sandwich structure is produced by means of the 3D printing technology. In the printing process, different food substrates and sandwiched materials are contained in different printing heads, the substrates and the sandwiched materials can be printed into products which are different in spatial shape and quantity according to design requirements, and meanwhile, the sandwiched materials can be completely wrapped by the substrates. By adoption of the invention, the defect that traditional sandwich food is simplex in sandwich structure is overcome, and diversified individualized demands of people can be met. The invention relates to printing performance under a multi-nozzle printing condition, which is different from printing performance researched by the present invention under a single-nozzle printing condition.

SUMMARY

The present invention aims at developing a method for improving the moldability and 3D precision printing performance of a high-fiber dough system by adding functional carbohydrate and has the four major purposes that firstly, flour is baking aged in advance, different ingredient compositions in a formula are adjusted at the same time, accordingly a better 3D printing effect is achieved, and subsequent processing intensity can be relieved to a large extent, so as to maintain a spatial structure of a printed product to the maximum extent; secondly, the printing performance of the dough system under a high fiber content condition is researched by adding concentrated asparagus pulp made from old stalks of asparagus, so as to provide a certain reference for subsequent printing of the high-fiber dough system; thirdly, printing dough is endowed with different functional characteristics by adding different types of functional carbohydrate; and fourthly, influences of different nozzle diameters, printing distances and printing temperatures on the printing performance are researched by means of the dough system, so as to provide a certain reference for other researchers for achieving precision printing.

The technical scheme of the present invention is that the method for improving the moldability and 3D printing performance of the high-fiber dough system by adding the functional carbohydrate comprises the step that the baked aged flour, the concentrated asparagus pulp made from the old stalks of asparagus, butter and the functional carbohydrate (trehalose or high maltose) are uniformly mixed and then printed by means of a 3D printer. A main formula comprises 100 g of the aged flour, 80 to 120 g of the concentrated asparagus pulp, 10 to 30 g of the butter and 10 to 30 g of the functional carbohydrate (such as the trehalose or the high maltose). To achieve an effect of precision printing, it needs to be considered that printing precision is largely related to a diameter of a printing nozzle, a distance between the printing nozzle and a printing platform (namely a printing distance) and a printing temperature. Experiments prove that the precision of a printed object can reach 95% or above when the nozzle diameter is 1.5 mm, the printing distance is 1.8 to 3.5 mm and the printing temperature is 25 to 35° C. Furthermore, collapse does not occur within 30 min after printing is completed.

With carbohydrate being a major ingredient, the 3D printing materials provided by the present invention contain rich dietary fibers, and can serve as basic food to provide energy for people. Meanwhile, the precision of the printed object can be greatly improved by adjusting different printing parameters such as the nozzle diameter, the printing distance and the printing temperature.

The specific steps are as follows:

(1) flour aging: flour is baked for 20 to 30 min in an oven at 210° C. to obtain the aged flour, so that starch is gelatinized, digestibility of the starch is improved, and a scorched flavor is generated to a certain extent.

(2) beating of the old stalks of asparagus: the old stalks of asparagus are cleaned and then cut into small segments which are 3 to 5 mm long, the segments are placed into hot water at 95 to 100° C. for 3 to 5 min of blanching, enzyme in the asparagus is passivated, and the segments are taken out and then cooled to room temperature through cold water. The blanched asparagus segments are placed into a beater for beating, and intermittent agitating is adopted with each 30-second beating period being followed by a 30-second pause till the pulp is fine and smooth, so as to prevent an overhigh beating temperature from damaging nutritious substances in the asparagus.

(3) concentrating: the asparagus pulp obtained through beating is contained in a special container and concentrated by adoption of vacuum microwaves (vacuum microwave equipment with a vacuum degree being 0.098 MPa, a microwave frequency being 2450 MHz and a power being 100-3000 W and linearly and continuously adjustable) until a moisture content is within the range of 80% to 85%. The concentrated asparagus pulp is stored in a refrigerator at 4° C. for standby application.

(4) beating of the butter: the butter is cut into blocks with an edge length being 1 cm, placed at room temperature to be fully softened, and then fully beat until a system is fluffy and wraps much air.

(5) material mixing: 80 to 120 g of the concentrated asparagus pulp, 10-30 g of the butter obtained through beating and 10 to 30 g of the functional carbohydrate are added into 100 g of the aged flour to form uniform slurry through mixing.

(6) determining of the nozzle diameter: the nozzle diameter is closely related to printing precision. Generally, the larger the nozzle diameter, the rougher the surface of the printed object, and the poorer the precision. The smaller the nozzle diameter, the higher the precision of the printed object. However, an excessively small nozzle diameter easily cause bar breaking, and difficult discharging. Therefore, molding characteristics of the printed object under the condition that the nozzle diameter is 0.8 mm or 1.5 mm or 2.0 mm are researched in the experiments.

(7) determining of the printing distance: in the printing process, the distance between the nozzle and the printing platform is also closely related to the precision of the printed object. When the printing distance is overlarge, extruded-out material bars cannot be completely and tightly combined with discharged material layers, a certain dragging effect can be caused, accordingly the precision of the printed object is poor, and molding is difficult. When the printing distance is excessively small, a certain extrusion effect may be caused, and the printing precision is greatly lowered. Therefore, influences of different printing distances on the precision of the printed object when the nozzle diameter is 1.5 mm are researched, and it is guaranteed that the printing precision can reach 95% or above when the printing distance is 1.8 to 3.5 mm.

(8) determining of the printing temperature: the printing temperature directly influences the viscosity and state of the materials, and also influences the printing performance to a certain extent. In terms of these materials, when the printing temperature is overhigh, the materials can be aged to a certain extent on the eve of discharging, the moisture content is lowered, the viscosity of the materials is greatly lowered, a bar breaking phenomenon is serious, and molding is difficult. It is determined that the appropriate printing temperature is 25 to 35° C. through the experiments.

The functional carbohydrate is the trehalose or the high maltose.

The present invention has the beneficial effects that the present invention researches that the viscosity and rheological property of the dough system are adjusted by adding the different functional carbohydrate, accordingly precision printing is better achieved, and meanwhile, the printing materials are endowed with certain functional effects; the digestibility of the flour is improved by baking and aging the flour in advance, subsequent processing modes such as high-intensity baking can be well avoided, and accordingly damage to spatial three-dimensional structures of the printing materials can be well avoided; and the influences of printing parameters and processes on precision printing are also researched by changing the printing parameters such as the nozzle diameter, the printing distance and the printing temperature, thereby providing a basis for better achieving precision printing.

DETAILED DESCRIPTION

Embodiment 1: Precision 3D Printing for High-Fiber Dough System with Trehalose Added Firstly, flour is baked for 20 to 30 min in an oven at 210° C., so as to improve the digestibility of the flour. Meanwhile, old stalks of asparagus which is cannot be eaten as fresh vegetables any more are cleaned, blanched, beat and subjected to other types of treatment, then concentrated in a microwave vacuum drying chamber (a vacuum degree is 0.098 MPa, a microwave frequency is 2450 MHz and a power is 100 to 3000 W and linearly and continuously adjustable) until a moisture content is around 80% to 85%, and then stored in a refrigerator for standby application. Butter is cut into small blocks, softened and then beat to be fluffy. Uniform pulp is prepared by adding 100 g of concentrated asparagus pulp, 20 g of the butter and 30 g of the trehalose into 100 g of the aged flour to be uniformly mixed. A nozzle with a nozzle diameter being 1.5 mm is adopted, a printing distance is 2.0 to 3.0 mm, and a printing temperature is 25° C.

Under the condition of the formula and the process, materials are not prone to bar breaking, continuous discharging is easy, precision of a printed object can be 95% or above, and structural collapse does not occur within 30 min.

Embodiment 2: Precision 3D Printing for High-Fiber Dough System with High Maltose Added Firstly, flour is baked for 20 to 30 min in an oven at 210° C., so as to improve the digestibility of the flour. Meanwhile, old stalks of asparagus which is cannot be eaten as fresh vegetables any more are cleaned, blanched, beat and subjected to other types of treatment, then concentrated in a microwave vacuum drying chamber (a vacuum degree is 0.098 MPa, a microwave frequency is 2450 MHz and a power is 100 to 3000 W and linearly and continuously adjustable) until a moisture content is around 80%, and then stored in a refrigerator for standby application. Uniform pulp is prepared by adding 100 g of concentrated asparagus pulp, 20 g of the butter and 30 g of the high maltose into 120 g of the aged flour to be uniformly mixed. A nozzle with a nozzle diameter being 1.5 mm is adopted, a printing distance is 1.8 to 2.5 mm, and a printing temperature is 35° C.

Under the condition of the formula and the process, materials are not prone to bar breaking, continuous discharging is easy, precision of a printed object can be 95% or above, and structural collapse does not occur within 30 min.

What is claimed is:

1. A method for improving the moldability and 3D printing performance of a high-fiber dough system comprising:
   (a) baking flour for 20 to 30 min in an oven at 210° C. to obtain aged flour;
   (b) cleaning stalks of asparagus; cutting the stalks of asparagus into small segments which are 3 to 5 mm long; placing the segments into hot water at 95 to 100° C. for 3 to 5 min of blanching; taking the blanched segments out and cooling to room temperature through cold water; placing the blanched asparagus segments into a beater for beating; and intermittent agitating of the blanched asparagus segments with each 30-second beating period followed by a 30-second pause till a concentrated asparagus pulp is formed;
   (c) containing the concentrated asparagus pulp in a container and concentrating by adoption of vacuum microwave equipment with a vacuum degree being 0.098 MPa, a microwave frequency being 2450 MHz and a power being 100-3000 W until the moisture content is 80% to 85%; and storing the concentrated asparagus pulp in a refrigerator at 4° C.;
   (d) cutting butter into blocks with an edge length being 1 cm, placing the butter at room temperature to be softened, and beating the softened butter;
   (e) adding 80 to 120 g of the concentrated asparagus pulp prepared in the step (c), 10 to 30 g of the butter obtained through beating in the step (d) and 10 to 30 g of trehalose or maltose to 100 g of the aged flour prepared in the step (a) to form a uniform mixture through mixing; and
   (f) printing the mixture by means of a 3D printer at 25 to 35° C. with a nozzle diameter of 1.5 mm and a printing distance of 1.8 to 3.5 mm.

* * * * *